United States Patent [19]
Bale et al.

[11] Patent Number: 5,771,202
[45] Date of Patent: Jun. 23, 1998

[54] METHOD FOR ACQUISITION OF SEISMIC DATA AT SEA

[75] Inventors: Richard Bale, Stavanger, Norway; Ian McMillan, Houston, Tex.

[73] Assignee: Geco A.S., Stavanger, Norway

[21] Appl. No.: 952,827

[22] PCT Filed: May 16, 1991

[86] PCT No.: PCT/NO91/00071

§ 371 Date: Jun. 30, 1993

§ 102(e) Date: Jun. 30, 1993

[87] PCT Pub. No.: WO91/18302

PCT Pub. Date: Nov. 28, 1991

(Under 37 CFR 1.47)

[30] Foreign Application Priority Data

May 22, 1990 [NO] Norway ................................ 902258

[51] Int. Cl.⁶ .............................. G01V 1/20; G01V 1/38
[52] U.S. Cl. ................................ 367/20; 367/19; 367/50; 367/58; 181/112
[58] Field of Search ................................ 367/16, 19, 20, 367/56, 58; 181/111, 112

[56] References Cited

U.S. PATENT DOCUMENTS

| | | | |
|---|---|---|---|
| 2,336,053 | 12/1943 | Athy et al. | 367/56 |
| 2,792,068 | 5/1957 | Peterson | 367/58 |
| 3,601,790 | 8/1971 | Sussex | 181/112 |
| 3,747,056 | 7/1973 | Treybig et al. | 367/56 |
| 4,316,266 | 2/1982 | Barbier et al. | 367/21 |
| 4,914,636 | 4/1990 | Garrotta | 367/56 |
| 4,970,696 | 11/1990 | Crews et al. | 367/15 |

FOREIGN PATENT DOCUMENTS

| | | |
|---|---|---|
| 2149503 | 8/1984 | United Kingdom . |
| 2149110 | 9/1984 | United Kingdom . |

*Primary Examiner*—Nelson Moskowitz
*Attorney, Agent, or Firm*—Jacobson, Price, Holman & Stern

[57] ABSTRACT

A method for acquisition of seismic data from an area surveyed using a group of seismic energy sources and a group of seismic streamer cables, particularly a marine area, includes forming a first group A from at least two elements of either seismic energy sources S or seismic streamer cables C having a spacing X between said elements, forming a second group B from at least two of the other elements of sources S or cables C than that forming group (A), spacing the elements in group B a distance equal to X multiplied by the number of elements in group A, forming a group C from at least two subgroups each consisting of a group A, spacing said subgroups in group C in distance equal to the distance between two elements in group B multiplied by the number of elements in group B, the spacing between two adjacent subgroups being equal to the lateral distance between midpoints between the subgroups, and forming further groups as desired D, E, F etc., by combining at least two subgroups of group B, C, D, respectively, etc., each further group having a lateral spacing between the midpoints between two adjacent subgroups equal to the lateral distance between the midpoints between two adjacent subgroups in group C, D, E, respectively, etc., multiplied by the number of subgroups in groups C, D, E, respectively, etc.

19 Claims, 11 Drawing Sheets

NUMBER OF GROUP ELEMENTS:2 *—X—* GROUP A

NUMBER OF
GROUP ELEMENTS:2 o————2X————o GROUP B

NUMBER OF      *|  *                    *  |* GROUP C
GROUP ELEMENTS:2   └———4X———┘ o       |    o                                    o    |    o
NUMBER └——————————8X——————————┘
OF GROUP ELEMENTS:2                        GROUP D o—X—o  GROUP A

*————2X———*  GROUP B o| o                    o |o  GROUP C
 └——4X——┘

*       |   *                              *    |   *
        └——————8X——————┘
                                            GROUP D

METHOD FOR ACQUISITION OF SEISMIC DATA AT SEA

BACKGROUND OF THE INVENTION

The invention relates to a method for acquisition of seismic data from an area which is to be surveyed by using at least two seismic energy sources and at least two seismic cables, and and more particularly relates to the acquisition of seismic data from a marine area.

Seismic surveys are conducted according to the principle that a seismic signal is transmitted from a seismic energy source, the signal is reflected from geological strata and the reflection is recorded in 2 seismic streamer cable which is preferably placed at a distance from the transmitter. In the case of symmetrical reflection the reflection point will lie midway between the source and the cable and this point is called the CDP (Common Depth Point).

In the present case the terms seismic streamer cable (also named cable), seismic energy source (also named source) and seismic total array are meant to cover the following type of elements:

The seismic streamer cable is a cable comprising a defined plurality of hydrophones or geophones. These hydrophones or geophones are registrating pressure pulses which are transferred to a registration/receiver system. The length of the cable may vary from some hundred meters to 6000–7000 meters. The hydrophones or geophones are positioned in groups and each group consists of a row of hydrophones/geophones. An example in practicle use may be a cable with a length of 3000 meters with each group having a length of 12.5 meters which results in 240 groups.

The term seismic energy source as used in this application comprises all types of sources, arrays and guns. The term also covers an amount of single guns provided in a pattern in such a way that when they are fired they will act as one seismic energy source. A typically seismic energy source may consist of two subgun arrays, each subgun array consisting e.g. of 4–20 single guns positioned partly in a row and the two subgun arrays being positioned a certain distance from each other, both in the direction of length and width, or only in one of these directions.

By total seismic array is meant an array comprising the seismic equipment being towed behind the vessel(s).

Figure 1:
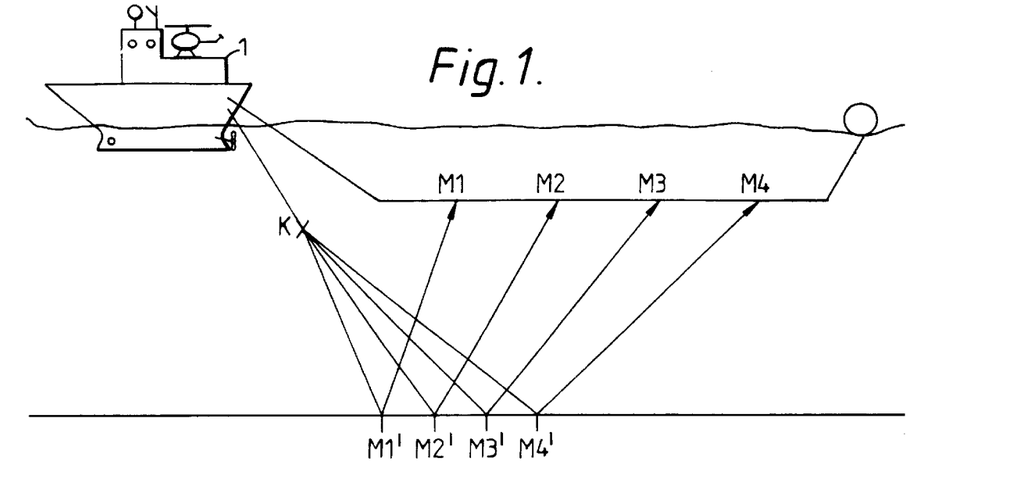
FIG. 1 is a schematic view showing the principle of acquisition of seismic data which forms the basis of both recognized technique and the present invention.

In marine seismic surveys a survey is made of a particular area of the sea, seismic vessels towing a set of seismic energy sources and or a set of seismic streamer cables. The total towing equipment consisting of seismic energy sources and seismic streamer cables is called a total seismic array. In principle, from several seismic energy sources, pulses are transmitted which are reflected from the seabed, received by receivers of hydrophone groups in the streamer cable, transmitted to recording equipment designed for the purpose of storage or processing. The vessel surveys the area by sailing back and forward along lines until a complete picture has been obtained of the geophysical conditions in the area. The principle of a survey of this nature is illustrated in the attached FIG. 1. Surveys of land areas can be conducted according to the same principle, but the following description refers exclusively to marine surveys, by means of which the principle of the invention can most easily be demonstrated.

Previous attempts have been made to make marine seismic measurements more efficient. Thus in U.S. Pat. No. 4,868,793, a method is described where seismic recording elements or individual sources are used in each area (array)/point source as elements in adjacent sources, so that the geometrical point for the source can be varied sequentially. However, this is a relatively complicated method and does not provide a wide lateral coverage. In British Pat. No. UK 1,193,507 a vertical positioning of receivers is described, but the same problems arise here in the case of faulty equipment as in the recognized technique. In British Pat. No. UK 1,285,769 an acquisition technique is described where two or more boats are used. In this case, however, the operation is conducted with a separate boat for the seismic energy sources and a separate boat for cables and recording equipment. With this kind of constellation it will not be possible to compensate for instance for failures which may occur during a survey. In U.S. Pat. No. 3,921,124 a combination is described of two sources and one streamer, but here too no attempt has been made to solve those problems. In British Pat. No. UK 1,580,835 the use of several sources and several receivers is described. Here a correlation program is used in order to distinguish which data samples/traces are to be compared. However, no description is given here of any geometrical arrangement combining several energy sources and receivers.

In order to rationalize such a seismic survey of an area, and to ensure that the survey is conducted as quickly and efficiently as possible in order to obtain a correct picture of the area, a number of different methods have thus been developed.

Figure 2:
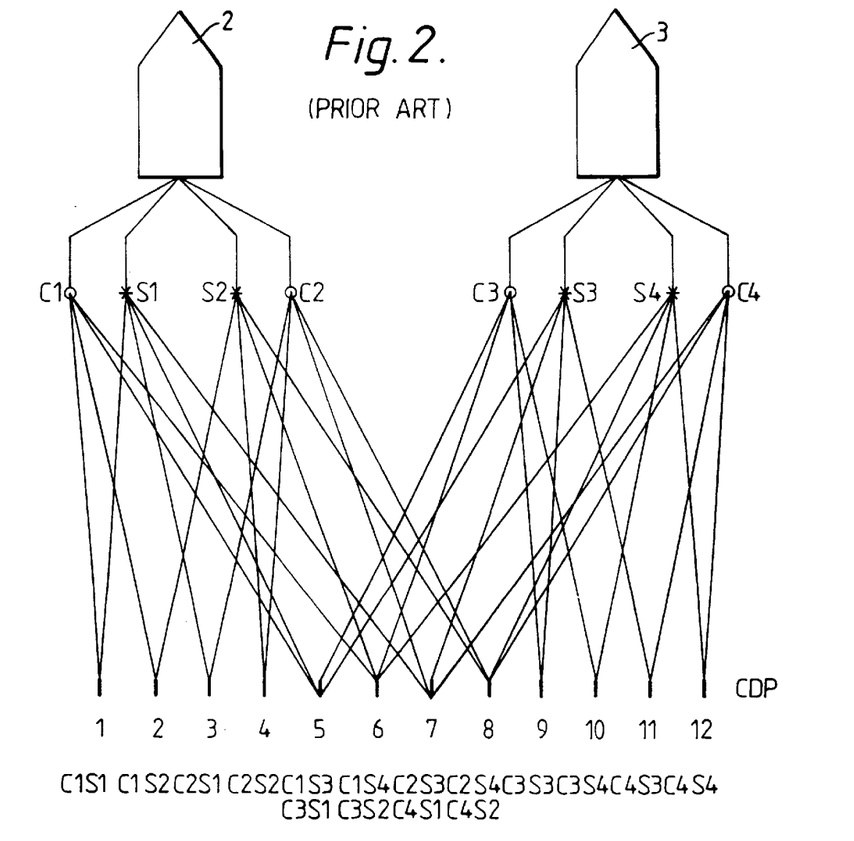
FIG. 2 is a schematic view which illustrates recognized technique for seismic surveys using two vessels and for recording of twelve lines of seismic data with one pass of a marine area.

In order to illustrate these methods reference is made to FIG. 2. Behind a ship a total seismic array is towed, in which the use of several seismic sources and several cables is combined. The individual cables in which the receiver elements or hydrophone or geophone groups are provided, will be positioned a distance from each other in order to cover the widest possible area during each pass along a line. In order to further rationalize and increase the efficiency of the seismic data acquisition, a method has also been utilized where two ships sail alongside each other as illustrated in FIG. 2. With such a constellation of seismic sources and recording equipment, i.e. streamer cables, the seismic energy sources have in principle been placed on the inside of the array and the streamers on the outside. It has thereby been possible to receive signals from the sources S1, S2, S3, S4 in each of the cables C1, C2, C3 and C4 and thus obtain a pattern of up to twelve CDP-lines for seismic recordings, thereby achieving coverage of a relatively wide line area with one pass.

The total seismic array consisting of seismic streamer cables and seismic energy sources, such as that illustrated in FIG. 2, have provided a relatively wide coverage area of CDP-lines, but optimum coverage has not been achieved since overlaps will occur as illustrated in FIG. 2.

Problems have also arisen if seismic energy sources or one of the seismic streamer cables fails during the recording, causing gaps to occur in the outlined line pattern, i.e. one or more of the CDP-lines are missing resulting in an incomplete picture of the desired area. This has resulted in the same area having to be covered again in order to obtain the required line density, an operation which is both time consuming and expensive.

Both of these factors have thus generated a need to find a solution where sources and cables are arranged in such a pattern in relation to one another that the CDP-lines provide an optimum coverage area or width, thus enabling the coverage of the area to be recorded to be conducted as quickly as possible.

BRIEF SUMMARY OF THE INVENTION

A main object of the present invention is to provide a method by which seismic energy sources and seismic cable equipment can be rearranged if faults should occur in the equipment during the survey.

Due to the increased coverage width there will still be advantages over the previously used methods since this method is based on a greater coverage width and it will normally only be necessary to repeat the recording in a part of the previous area.

A further partial, object is to design the positional constellation of seismic energy sources and seismic streamer cables for a marine survey in such a way that in the event of a fault a reorganization can be performed in a simple and time-saving manner, thus enabling full coverage to be maintained of an albeit narrower area or the missing CDP-lines to be left in such a way that on a return pass full coverage can be obtained while at the same time maintaining a maximum width of acquisition.

In any case it is an essential object of the invention that in addition to the maximum possible coverage width for the acquisition a recording of data should be obtained in CDP-lines which lie equally spaced from one another and with the desired density.

These objects are achieved with a method of the type described in the introduction, which is characterized by the features of the invention hereinafter described.

By following the method in accordance with the invention a total seismic array consisting of cables and sources can be provided which supplies an absolutely even line pattern with parallel CDP-lines and where those lines which are generated by the interaction between the respective sources and cables give an optimum number of lines. By means of the method according to the invention, it will therefore be possible to achieve a marked increase in capacity with the same technical equipment which was used previously, and by using larger or more towing vessels a substantial increase in width can be achieved for the survey. As an example, reference can be made to the constellation illustrated as prior art in FIG. 2. With the equipment shown there, by proceeding in accordance with the invention, it will be possible to record 16 lines of data alongside one another, while to date it has only been possible to record a maximum of 12 such lines. This represents a clear increase in capacity. In the event of faults in the equipment, for special combinations, it will be possible by means of a simple transfer, i.e. alteration of the distance between sources, or sources and cables, or cables, to obtain a distribution which enables recording to continue, albeit with fewer lines, but with closely spaced lines. In the case of failure either of a cable or an energy source, it will still be possible to obtain up to 12 recording lines, i.e. a result will be obtained which is at least as good as that achieved by the previously used technique.

BRIEF DESCRIPTION OF THE DRAWINGS

A more detailed description of the invention will be presented in the following section describing embodiments with reference to the accompanying drawings wherein.

DETAILED DESCRIPTION

As already described above, FIG. 1 illustrates the basic principle of acquisition of seismic data from the seabed, with the wave propagation path shown. For reasons of simplicity only the seabed and reflection together with a flat seabed are illustrated here. A vessel 1 tows a seismic energy source K which is illustrated as a point source which at a given point in time will transmit a seismic pulse which is reflected in the points M1'–M4'. From these points signals are reflected up to the seismic cable which records reflections in four receiver channels M1–M4.

FIG. 2 illustrates 2 previously known method used where two ships 2, 3 sail alongside each other and where the signals which are transmitted from four energy sources S1–S4 are recorded by hydrophones in four cables C1–C4. Due to the mutual positioning, data will be recorded along twelve lines where data, e.g. from source S1 is recorded in cables C1–C4, and further that signals which are transmitted from source S2 and which are reflected from the seabed are also recorded in cable C1 etc. so that a line pattern is created which is illustrated at the bottom of the figure. It can be seen that in the central area there will be an overlap of four recording lines which will thus cover the same line two by two. This is not an optimum utilization of expensive technology and will only offer security to the data recorded in the central area if any of the sources should fail.

Figures 3A, 3B:
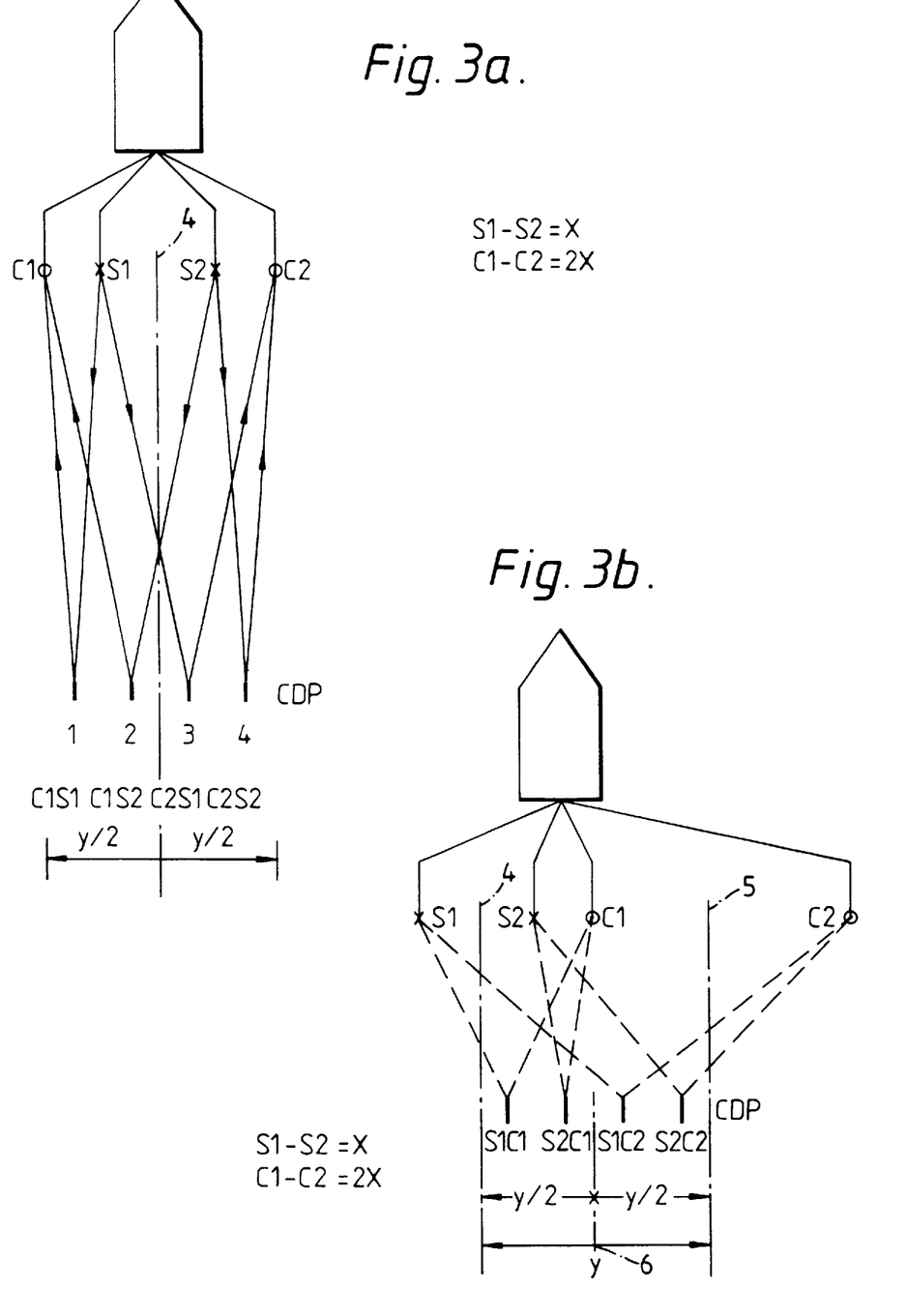
FIGS. 3a and 3b are schematic views of two embodiments which illustrate the principle of the method according to the invention with two energy sources and two cables, with a symmetrical and an asymmetrical positioning respectively.

FIG. 3a illustrates a vessel towing two energy sources (S1, S2) and two cables (C1, C2). The distance between the two energy source elements is X, and the distance between the two cable elements is 2X. With this configuartion of energy sources and cables 4 CDP lines (1:C1S1, 2:C1S2, 3:C2S1, 4:C2S2) will be obtained. In FIG. 3a the lateral distance between the center 4 of the distance between the source elements and the center 4 of the distance between the cable elements, called y is 0 because these centers coincide. The source elements and the cable elements are arranged symmetrically.

FIG. 3b illustrates how the same number of source elements and cable elements are arranged asymmetrically. It is the same distance X between the energy source elements, and the lateral distance between the cable elements is 2X. Since the cable elements and the source elements are arranged asymmetrically, the lateral distance y between the center 4 of the source elements and the center 5 of the cable elements is greater than 0 because centers 4 and 5 do not coincide. The CDP coverage obtained (S1C1, S2C1, S1C2, S2C2) will be placed symmetrically to the midpoint 6 of y.

FIG. 4a–4j illustrate some possible arrangements by using the method according to the invention. The different groups are indicated at A, B, C, D, etc.

Figure 4A:
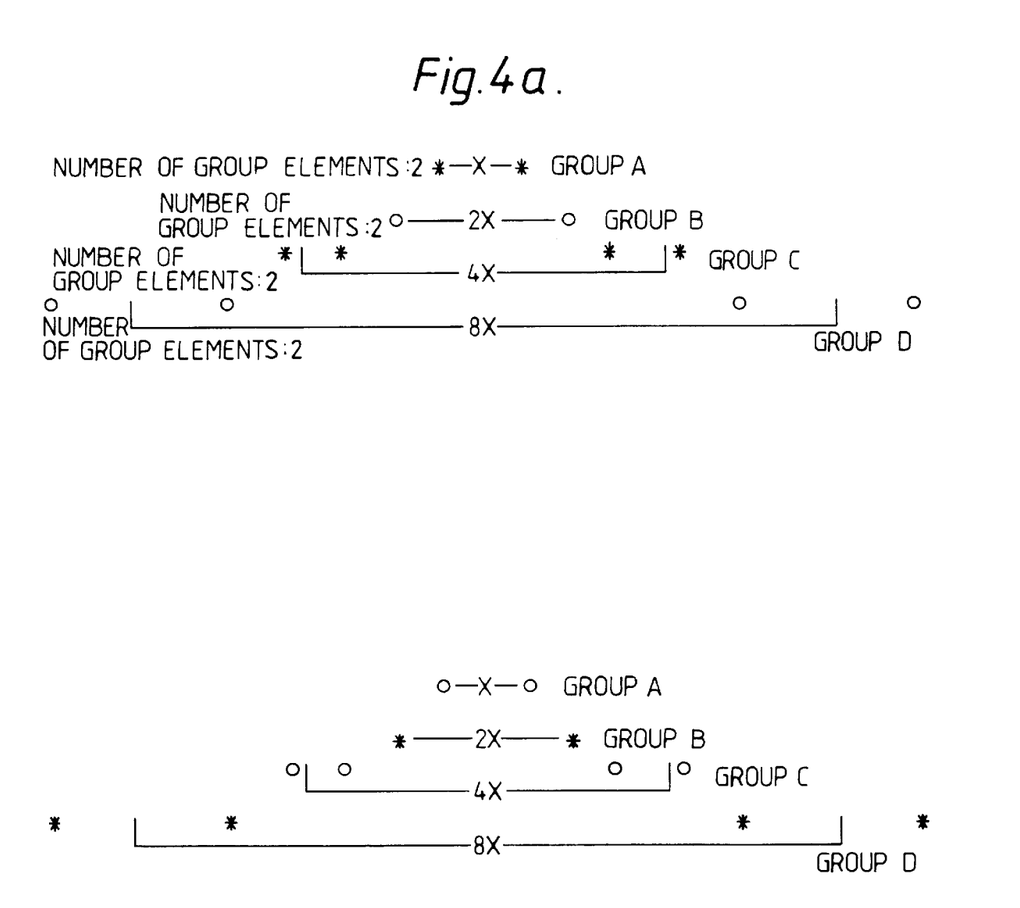
FIG. 4a is a diagrammatic illustration of positioning possibilities for sources and cables using the method according to the invention, with sources and cables exchanged in the lower part of the illustration.

FIG. 4a illustrates how the arrangement is built up originating from the smallest possible grouping in groups A and B, consisting of two elements each, and then groups C and D consisting of two elements each. Groups C and D are used to form a configuration for deployment of four cables and four energy sources giving an optimum CDP coverage of 16 lines. The lateral distance between the two elements in group A is X. The lateral distance between the two elements in B should be 2X. The distance between two elements in group A is multiplied by the number of elements in group A. If 3 elements were used in group A, the lateral distance between the elements in group B would be 3X. Group C consists of two elements of a group A. Since each element in group C consists of a group A which consists of two elements, we need to refer to lateral distances to the midpoints of an element, when referring to elements in group C, and all further groups i.e. D, E, F etc. This means that the lateral distance between the midponts of two adjacent elements in group C is equal to the lateral distance between two adjacent elements in group B (in FIG. 4a the distance is 2X) multiplied by the number of elements in group B (in FIG. 4A the number of elements in group B is 2). The lateral distance between the midpoints of two adjacent elements in group C as shown in FIG. 4a is 4x. Further FIG. 4a shows a group D which consists of elements of group B. The lateral distance between the midpoints of two adjacent elements in group D is the lateral distance between the midpoints of two adjacent elements in group C, multiplied with the number of elements in group C. In FIG. 4a the distance between two adjacent elements in group C is 4X and the number of elements in group C is 2. The distance between the midpoints of the two elements in group D is therefore 8X.

The upper part of FIG. 4a shows the arrangement with elements in group A and C being energy sources, and elements in group B and D being cables. The lower part of FIG. 4a shows the arrangement with elements in group A and C being cables, and elements in group B and D being sources. The upper and lower parts of FIG. 4a show as mentioned earlier that energy sources and cables are interchangeable as long as it is consistent.

Figure 4B:
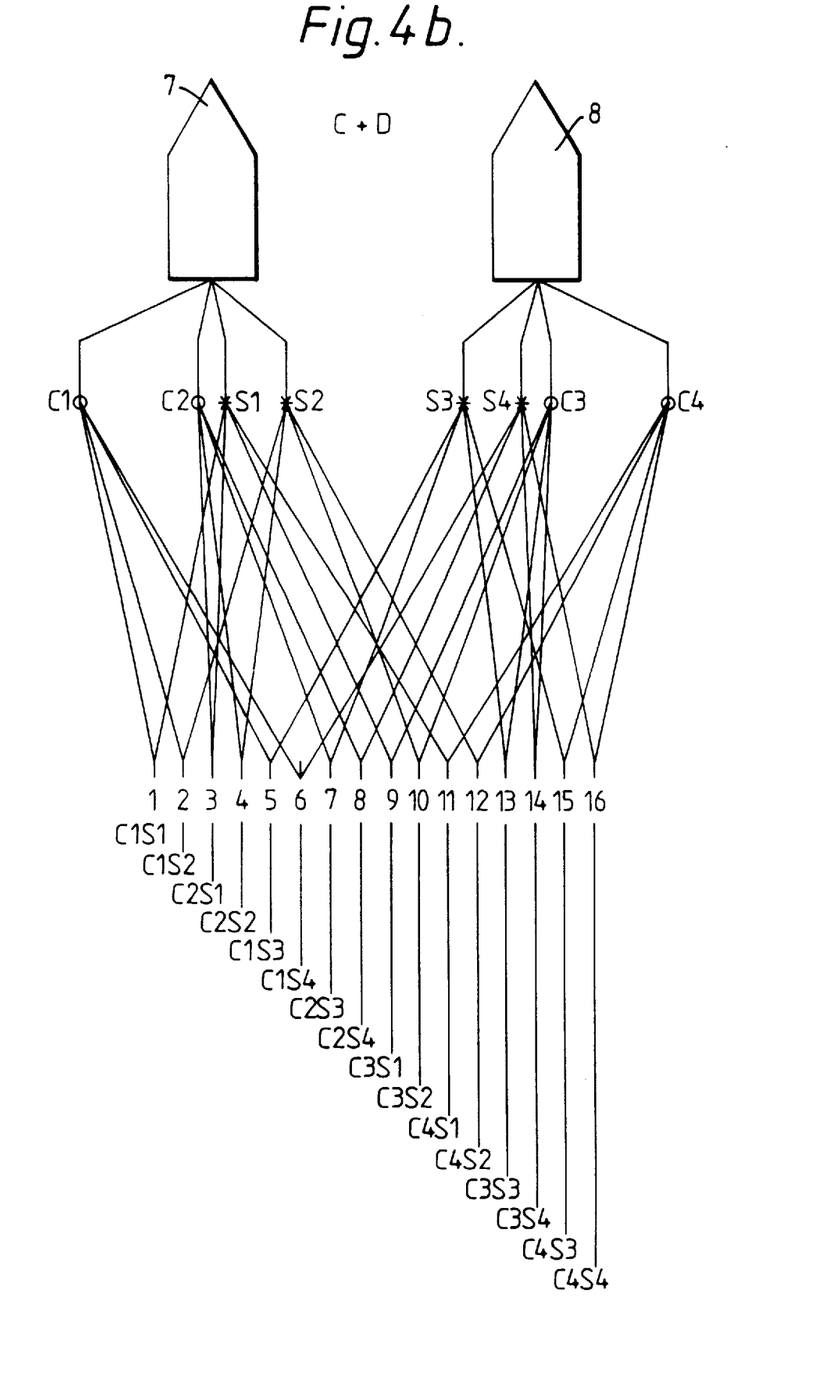
FIG. 4b is a view similar to FIG. 2 showing an embodiment achieved by the method according to the invention.

FIG. 4b shows a total seismic array configuration deployed in accordance with this invention and as a combination of group C and group D as shown in FIG. 4a. The optimum CDP coverage of 16 CDP lines is obtained. In the figure two vessels 7, 8 are illustrated, but the number of vessels could be any number. In FIG. 4b the CDP lines which are recorded will be symmetrical to the tow/constellation since sources and cables are arranged symmetrically.

Figure 4C:
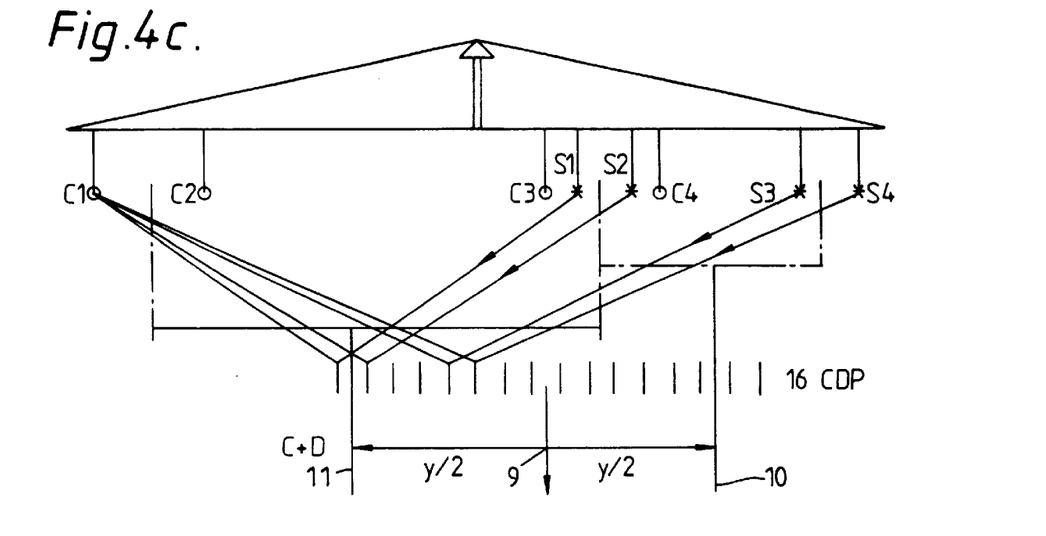
FIGS. 4c–4j are schematic views showing examples of positioning of groups, according to the invention.

FIG. 4c illustrates an asymmetrical positioning of sources and cables, where the same combination of groups C and D is used as described above, but in this case the groups are positioned displaced laterally to each other. This will give exactly the same pattern of CDP-lines as in the symmetrical arrangement. The CDP-lines will be placed symmetrically in relation to the midpoint 9 of the lateral distance between the center line 10 in the source arrangement and the center line 11 in the cable arrangement. Should a displacement occur in the towing constellation, this will mean a displacement of the line positioning since the centering line for the CDP-line will be displaced, but the measurements will not be altered. In this case it is important to ensure that the spacing between sources and between cables is maintained.

Figure 4D:
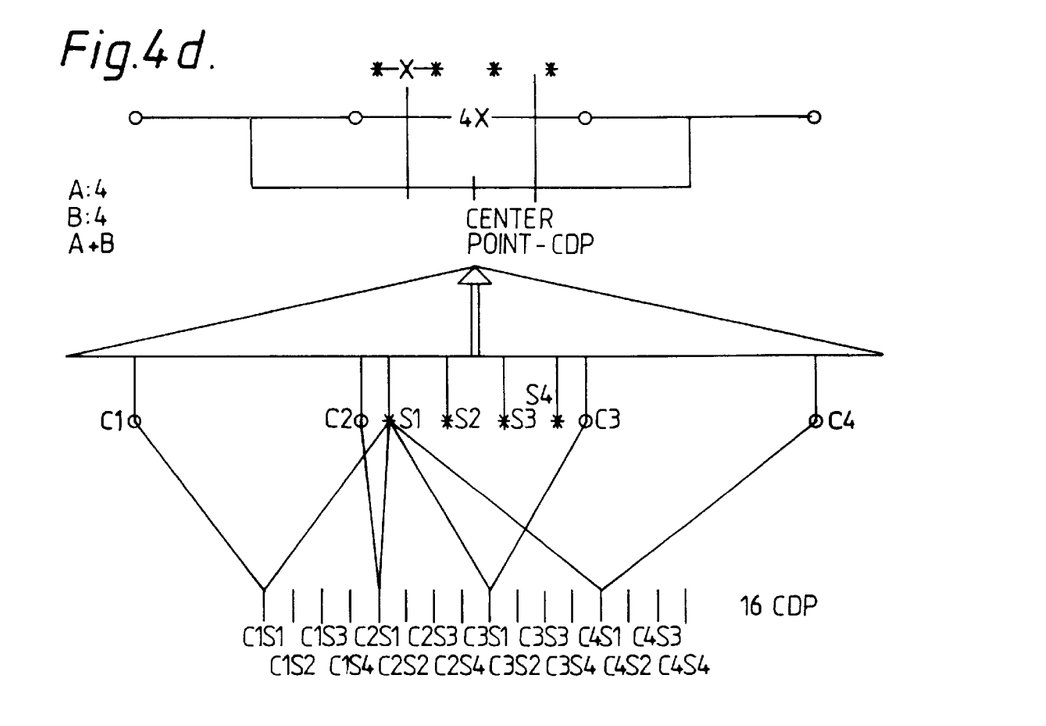

FIG. 4d illustrates an embodiment of the method using four sources with spacing x as group A combined with four cables in group B which will then have the spacing 4x.

Figure 4E:
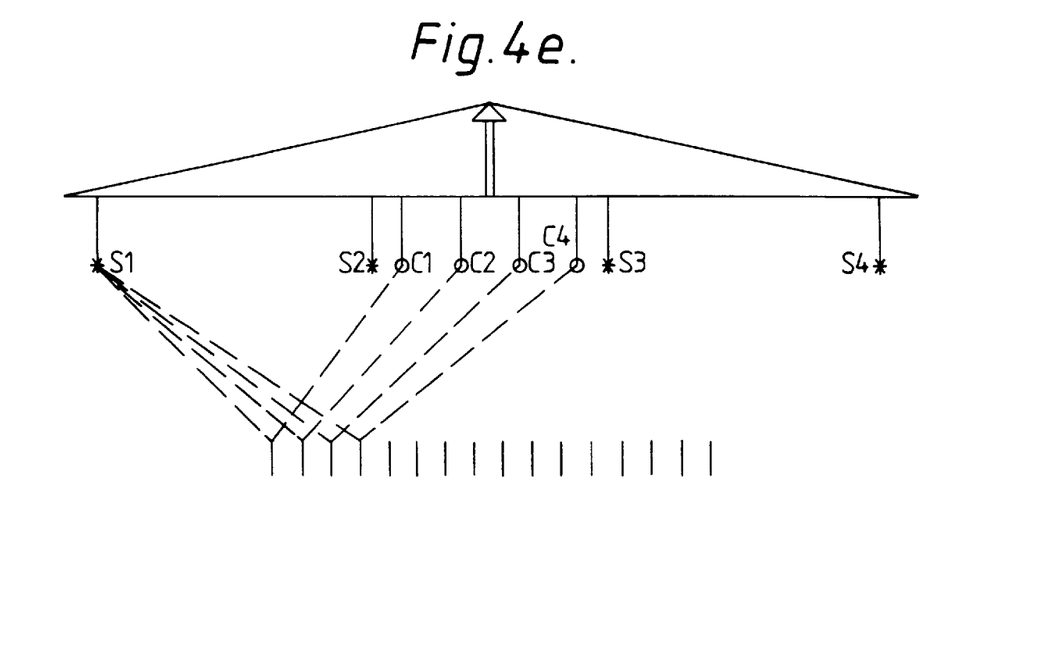

FIG. 4e illustrates the corresponding structure, where sources and cables have changed places in relation to FIG. 4d. Otherwise the same pattern will be obtained in both cases for the CDP-coverage, as illustrated at the bottom of the figures.

Figure 4F:
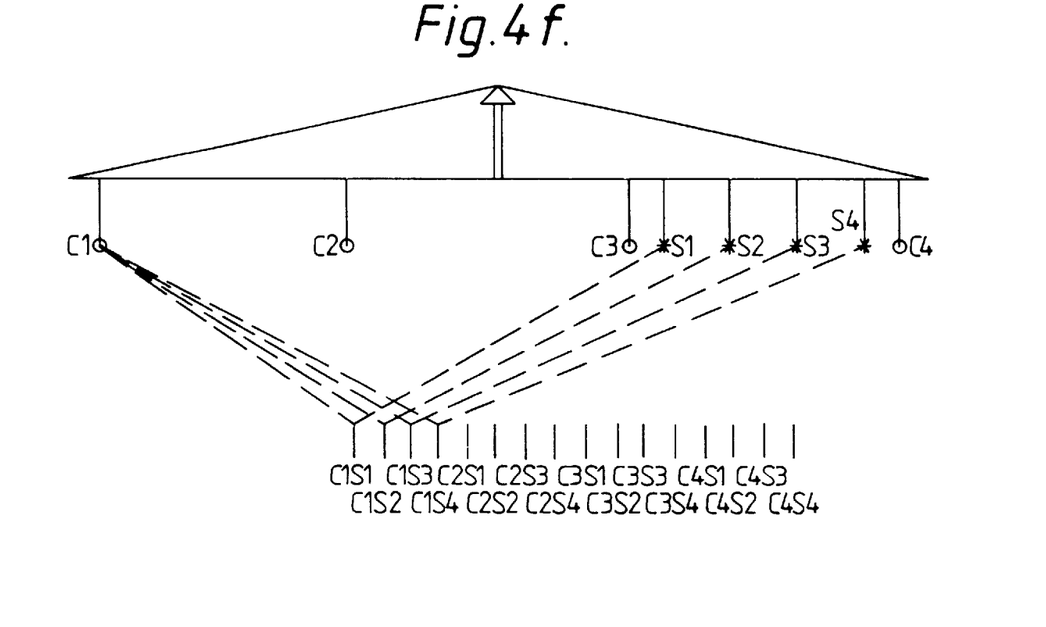

FIG. 4f illustrates an arrangement similar to the two previous figures, but with a relative displacement of the groups in relation to each other. Also in this embodiment the CDP-lines will be placed as described earlier, i.e. symmetrically in relation to the midpoint of the lateral distance between the center lines of the respective groups.

Figure 4G:
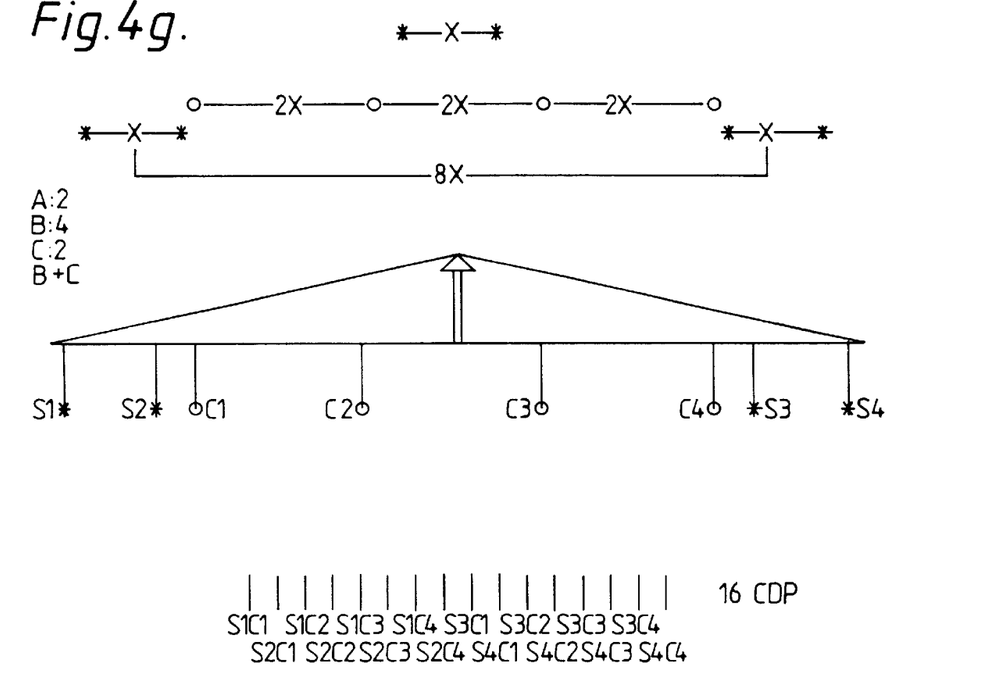

FIG. 4g illustrates a method using two elements of group A, four elements/units from group B, and two elements consisting of group A as group C. Groups B and C are combined.

Figure 4H:
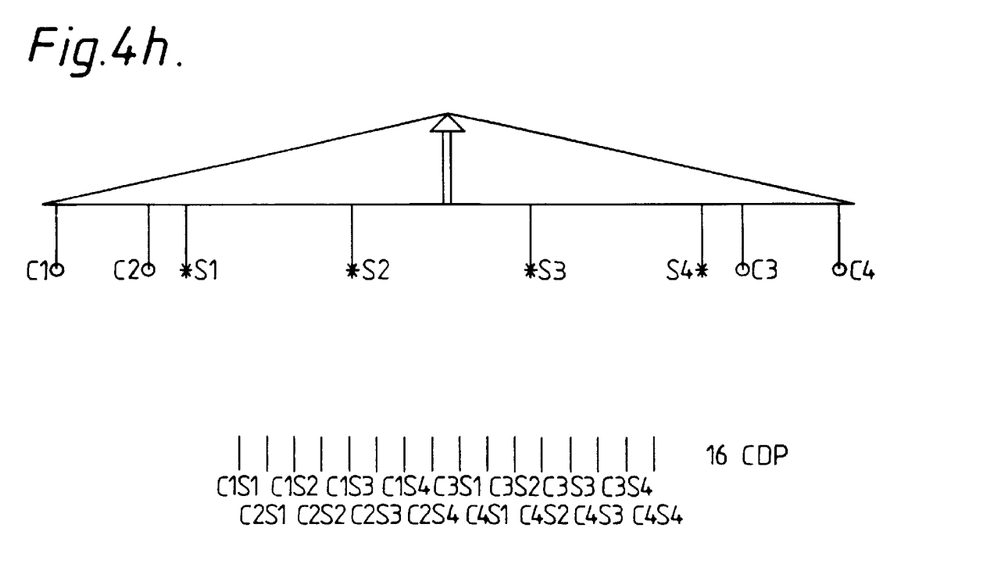

FIG. 4h shows the example of FIG. 4g with reversal of sources and cables and this figure also illustrates the CDP-line coverage obtained with 16 lines.

Figure 4I:
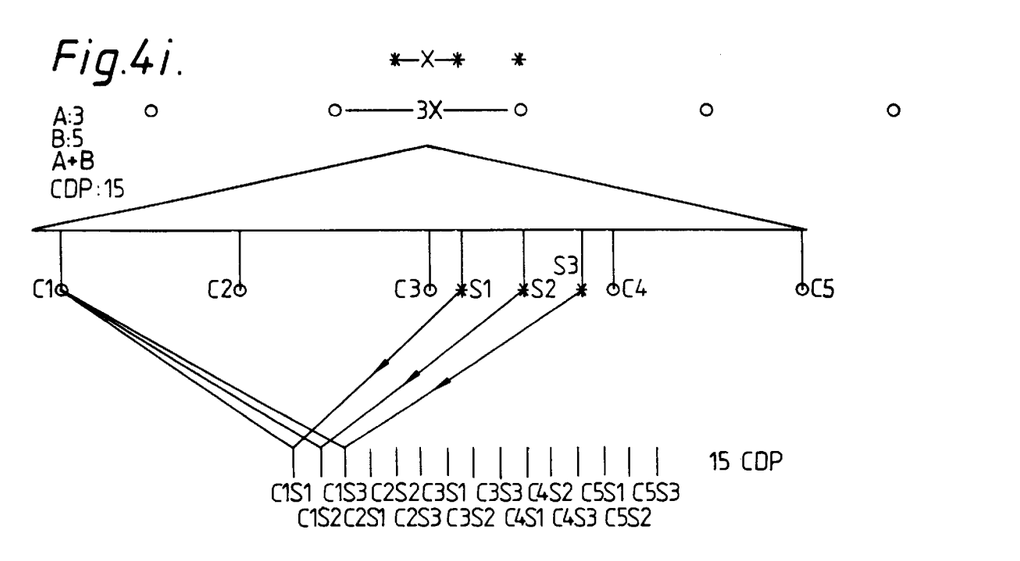
Figure 4J:
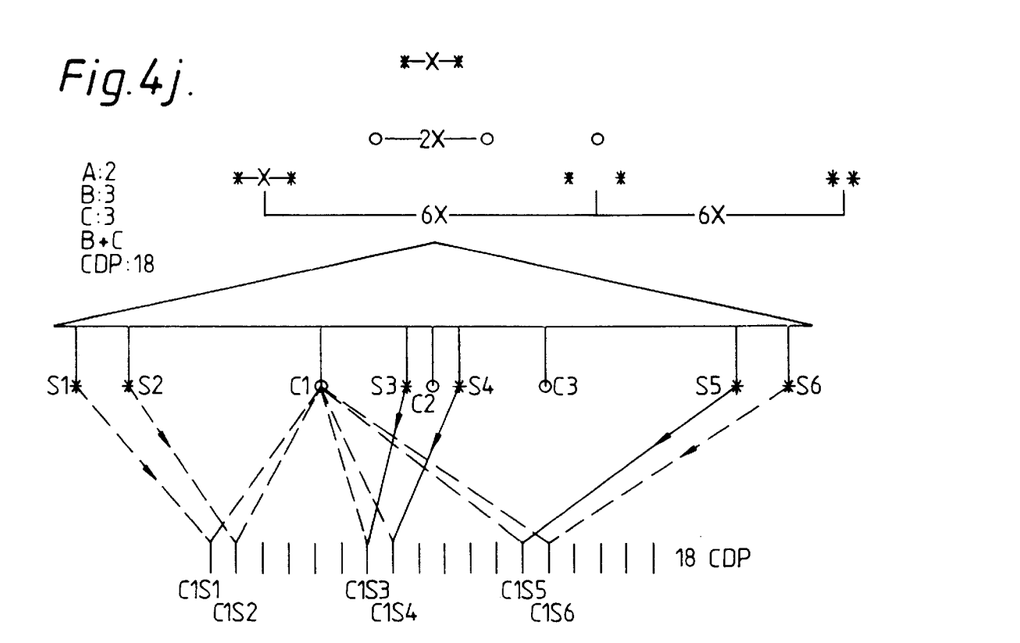

FIG. 4i and FIG. 4j illustrate the use of the method in connection with an uneven number of sources and cables in the groups. FIG. 4i is based on the use of three sources in group A and five cables at group B, which will be placed in a distance 3x from each other. When combining these groups A and B 15, CDP lines are achieved as shown in the figure.

In FIG. 4j there has been used two elements in group A, three elements in group B (distance 2x) and three elements in group C (distance 2x·3=6x). The number of CDP-lines will be 18.

It should be evident from these illustrations that it is possible to gradually achieve the potential widths which can still be obtained in practice with the aid of towing vessels at sea or where the limits are set by what can be processed by computer. As mentioned earlier, in all the illustrated embodiments and also the other possible combinations which can be obtained by the method, an exchange of sources and cables can be performed, the vital factor being that this should be done completely i.e. by exchanging all sources with cables and vice versa. The principles can also be applied on dry land, even though the major benefits are particularly marked in connection with seismic surveys where desired routes can more easily be followed by boat. In the following figures an embodiment is illustrated, which shows how to alter the towing configuration in order to compensate for any faults that may occur.

Figure 5:
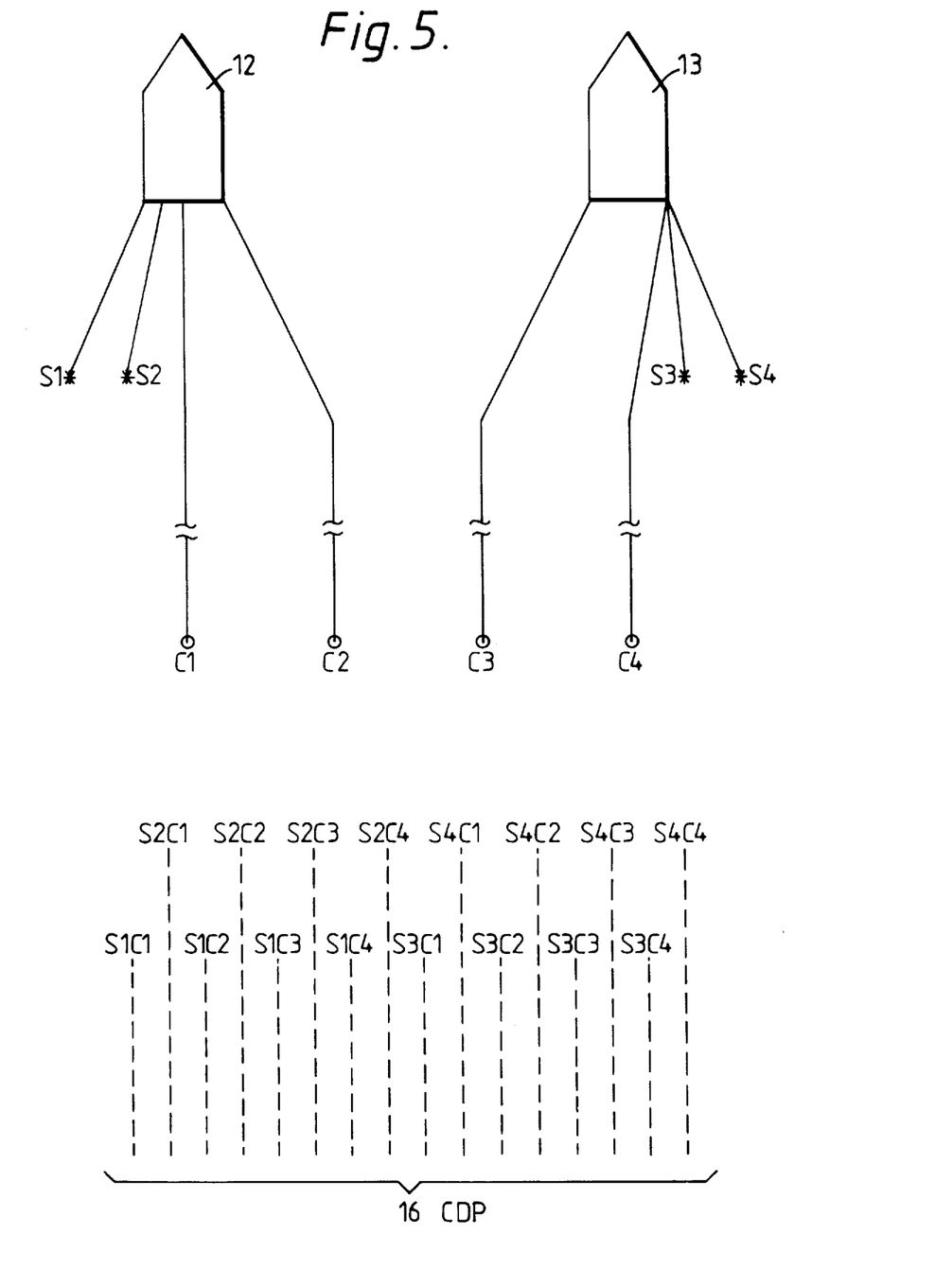
FIG. 5 is of a further schematic view of the invention.

Thus FIG. 5 illustrates an array with two boats 12, 13 alongside each other as was also illustrated in FIG. 2, with the seismic energy sources being placed on the outside of the total seismic array, while the streamers are placed in the middle, i.e. in accordance with the invention (and also as shown on FIG. 4b). This reorganization means that there is no longer any overlapping of recording lines as in the embodiment in FIG. 2 and a recording coverage 16 lines wide is obtained. Should any faults occur in the equipment during the survey, this can be compensated for as illustrated in the following figures.

Figure 6:
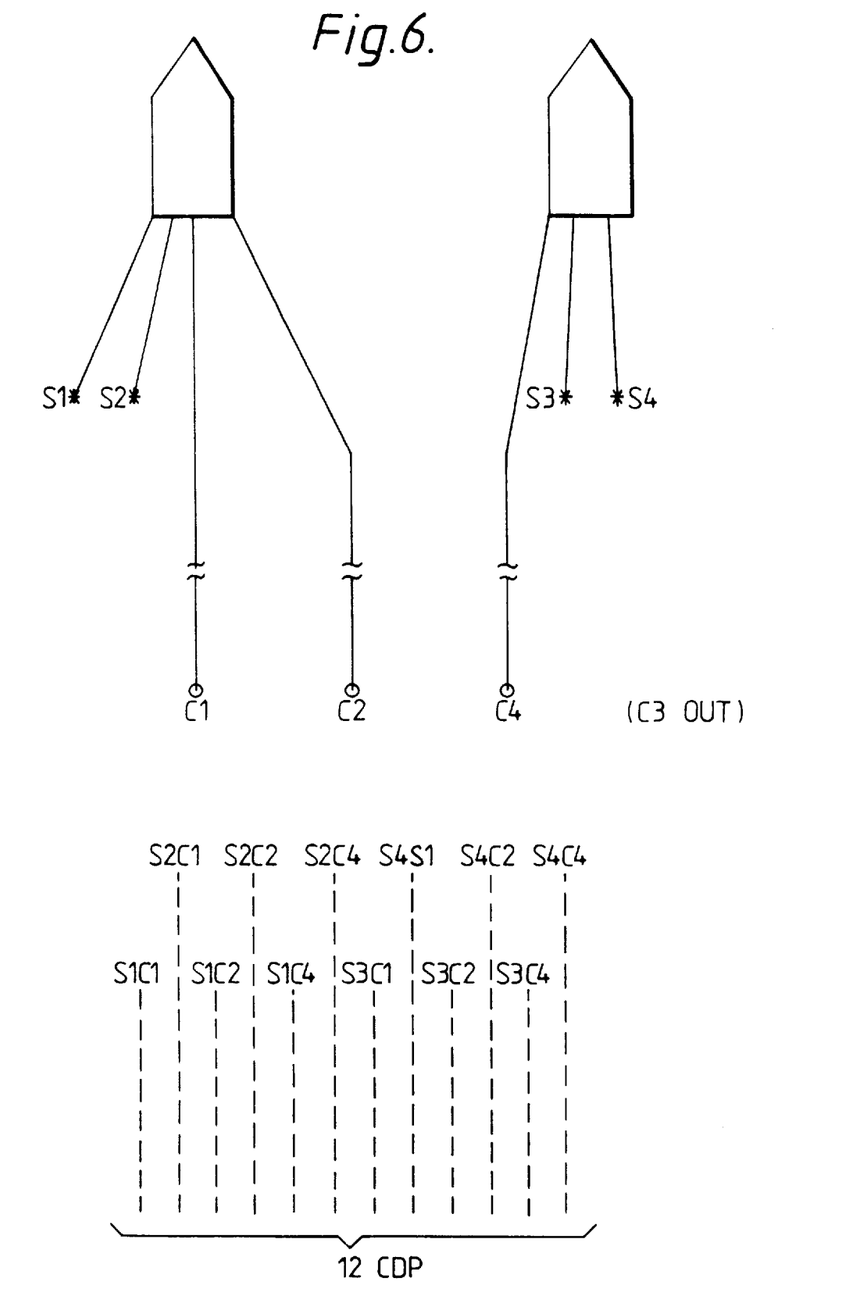
FIG. 6 is a view which shows the embodiment in FIG. 5, but with one cable out of operation.

FIG. 6 shows the same arrangement as in FIG. 5, but in this case a fault has arisen in the cable which was called C3, so this cable is no longer in function. The cable can then be taken on board the ship and repaired or replaced with another cable. In the meantime the survey can continue, since all that is required is to transfer the remaining streamer C4 from one of the vessels together with the two energy sources, so that they are positioned as illustrated in FIG. 6. Streamer C4 has thus been transferred to the position previously held by streamer C3. The energy sources S3 and S4 have been moved so that the distance between them remains x with 2x corresponding to the spacing between two streamer cables. The distance between source S3 which lies closest to the streamer and the streamer C4 is set at x/2. A line diagram shows 12 lines which correspond to the previously used technique, but with these 12 lines at an equal and even distance from one another, so that a complete picture of this strip is obtained. In other words, even after a fault has arisen a complete coverage has been obtained of a relatively wide area. When the ship returns and surveys the next line width of the marine area, it can sail into this area with twelve lines, thus achieving maximum utilization of the ship.

Figure 7:
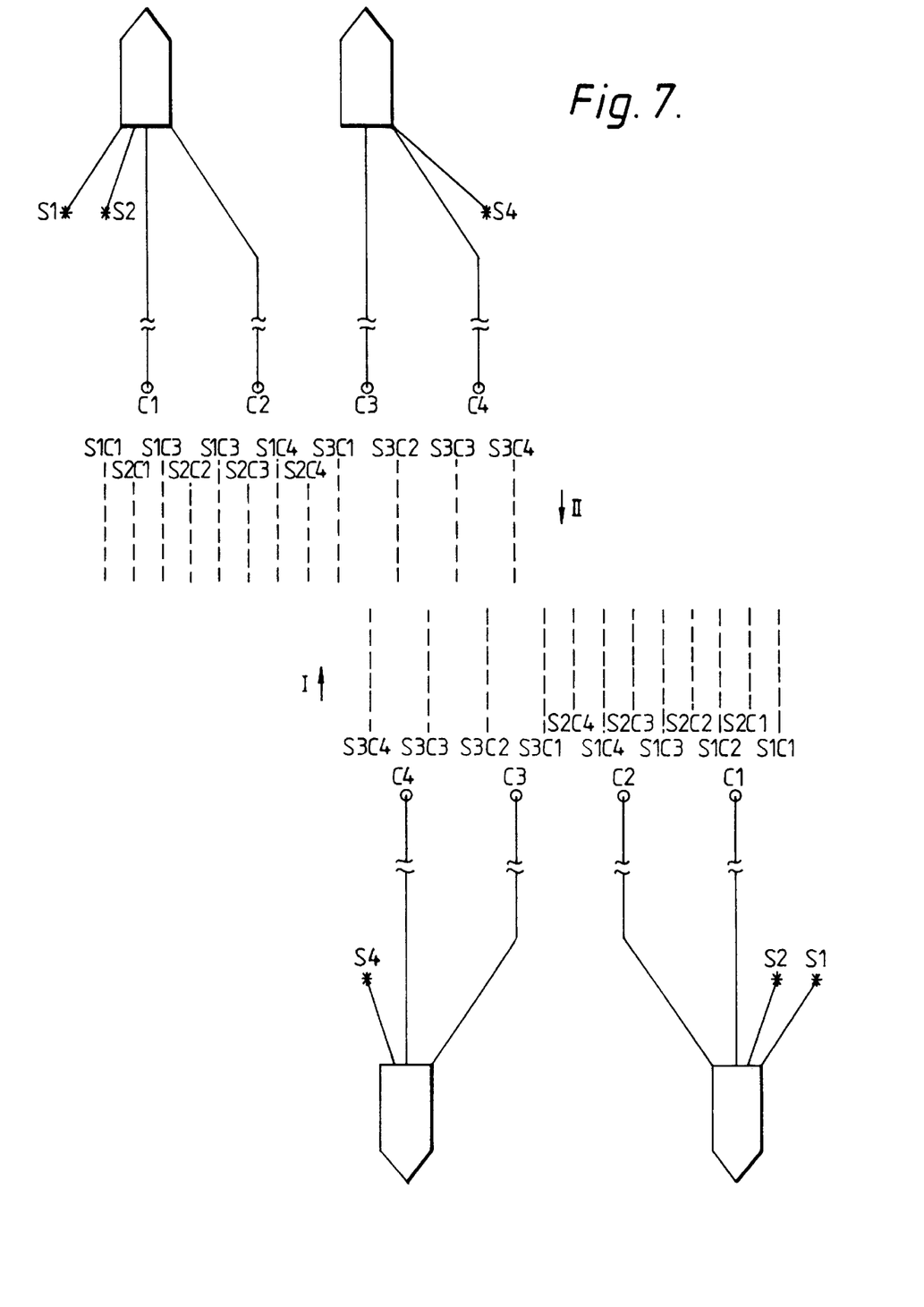
FIG. 7 is a view which shows the embodiment in FIG. 5, but with one of the seismic energy sources out of operation, this figure also illustrating the pass of the marine area in two directions.

FIG. 7 illustrates the case where one of the seismic energy sources has failed. As illustrated in the upper part of the figure, in this case too it will be possible to record twelve lines, but three of these lines will have double the required spacing. This pattern is achieved by, e.g., transferring energy source S4 to the position of energy source S3 if it was energy source S3 which failed. What has been achieved in this case is to concentrate the lower degree of coverage on a peripheral area of the survey, thereby easily compensating for this greater width when making recordings in the opposite direction by making the boat sail in the manner illustrated in the lower part of the figure. In this way it can be seen that "gaps" in the CDP lines can be covered, thus obtaining a complete picture with dense and even coverage all the way, thereby avoiding the necessity of making a pass of exactly the same area twice. Should the fault arise on the other side of the ship in relation to the survey direction, the ships can change places or the sources can be re-deployed.

Thus it can be seen that by the special positioning of the energy sources and cables in accordance with the invention clear advantages can be achieved in relation to the method previously used, and a rational and efficient as well as a complete acquisition of seismic data can be achieved for a desired marine area.

Many modifications for positioning of energy sources and cables in relation to each other will be possible on the basis of the special basic constellation in accordance with the invention.

We claim:

1. A method for acquisition of seismic data from a marine area being surveyed by using a group of seismic energy sources and a group of seismic streamer cables comprising:

towing at least two seismic energy sources and at least two seismic streamer cables in a direction of travel over said area;

forming a first group A comprising at least two elements selected from the group of first and second types of elements consisting of said seismic energy sources and seismic streamer cables respectively, said group A comprising only one of said types of elements;

arranging said at least two elements of said group A in a linear array substantially transversely to said direction of travel with a spacing X between adjacent elements;

forming a second group B comprising at least two of the other type of said elements;

arranging said at least two elements of said group B in a linear array substantially transversely to said direction of travel with a spacing between adjacent elements in said second group B equal to X multiplied by the number of elements in said group A;

forming an Nth group, where N is greater than 2, of elements of said first type of element when N is an odd number and of said second type of element when said N is an even number;

arranging said Nth group of elements in a linear array substantially transversely to said direction of travel;

providing at least two subgroups in adjacent spaced relationship with mid-points between said subgroups, each subgroup comprising an N−2 group with the spacing between mid-points of adjacent subgroups being equal to the distance between adjacent mid-points of subgroups of the N−1 group multiplied by the number of elements in the N−1 group; and arranging said seismic energy sources and seismic streamer cables in accordance with positions determined by at least a Jth and a J+1 group, where J is a number between 1 and N−1.

2. The method as claimed in claim 1 wherein:

said sources and streamer cables are deployed with said first group A and said second group B only; and each group comprises at least three of said respective elements.

3. The method as claimed in claim 1 and further comprising:

forming two subgroups each comprising two of said sources with a lateral distance X therebetween;

spacing mid-points of said two subgroups of sources with a lateral distance 4 X therebetween;

forming two subgroups each comprising two streamer cables with a lateral distance 2 X therebetween; and spacing mid-points of said two cable subgroups with a lateral distance 8 X therebetween.

4. The method as claimed in claim 1 and further comprising:

forming two subgroups each comprising two streamer cables with a lateral distance X therebetween;

spacing mid-points of said two cable subgroups with a lateral distance 4 X therebetween;

forming two subgroups comprising two sources with a lateral distance 2 X therebetween; and spacing mid-points of said two subgroups of sources with a lateral distance 8 X therebetween.

5. The method as claimed in claim 1 and further comprising:

arranging three of said sources with a lateral distance X between each two adjacent sources; and arranging five streamer cables with a lateral distance 3 X between each two adjacent streamer cables.

6. The method as claimed in claim 1 and further comprising:

arranging three of said streamer cables with a lateral distance X between each two adjacent cables; and arranging five of said sources with a lateral distance 3 X between each two adjacent sources.

7. The method as claimed in claim 1 and further comprising:

forming two subgroups each comprising two of said sources with a lateral distance X therebetween;

spacing mid-points of said two subgroups of sources with a lateral distance 6 X therebetween; and arranging three streamer cables with a lateral distance 2 X between each two adjacent streamer cables.

8. The method as claimed in claim 1 and further comprising:

forming two subgroups each consisting of two streamer cables with a lateral distance X therebetween;

spacing mid-points of said two cable subgroups with a lateral distance 6 X therebetween; and arranging three sources with a lateral distance 2 X between each two adjacent sources.

9. The method as claimed in claim 1 wherein:
said mid-points of said two groups do not coincide.

10. The method as claimed in claim 1 wherein:
said two groups do not overlap.

11. The method as claimed in claim 1 and further comprising:
generating seismic signals by said group of sources;
detecting said seismic signals by said group of cables; and
recording said signals detected by said cables.

12. The method as claimed in claim 1 and further comprising:
positioning all sources at outermost parts of a total seismic array comprised of said seismic energy sources being towed;
towing said cables in parallel tracks in the middle of said total seismic array; and
maintaining equal spacing between said cables.

13. The method as claimed in claim 12 and further comprising:
spacing said sources lying nearest to said cables on each side a distance from said nearest cables equal to one-fourth of the spacing between said cables.

14. The method as claimed in claim 13 and further comprising:
providing a plurality of sources on at least one side of said total seismic array; and
spacing adjacent sources with respect to each other a distance equal to one-half of the distance between any two adjacent cables.

15. The method as claimed in claim 1 and further comprising:
forming said first group A and second group B from at least three of said sources and at least three of said cables.

16. The method as claimed in claim 1 and further comprising:
forming said group A from four seismic energy sources spaced a lateral distance X between each two adjacent sources;
forming said group B from 4 seismic streamer cables; and
spacing said seismic streamer cables a lateral distance 4 X between each two adjacent streamer cables.

17. The method as claimed in claim 1 and further comprising:
forming said group A from four streamer cables spaced a lateral distance X between each two adjacent streamer cables;
forming said group B from four seismic energy sources; and
spacing said seismic energy sources a lateral distance 4 X between each two adjacent seismic energy sources.

18. The method as claimed in claim 1 and further comprising:
forming two subgroups each comprising two of said sources with a lateral distance X therebetween;
spacing said two subgroups with a lateral distance 8 X between said mid-points of the distance between said two subgroups; and
spacing four streamer cables with a lateral distance 2 X between two adjacent streamer cables.

19. The method as claimed in claim 1 and further comprising:
forming two subgroups, each subgroup comprising two streamer cables;
spacing said two streamer cables apart a lateral distance X;
spacing said two subgroups so that mid-points thereof are a lateral distance apart equal to 8 X;
four seismic energy sources; and
spacing said four seismic energy sources so that the lateral distance between two adjacent sources equals 2 X.

* * * * *